C. NUTTING & C. NUTTING, Jr.
Improvement in Wheelbarrows.

No. 133,170. Patented Nov. 19, 1872.

Witnesses

Inventors
Calvin Nutting
Calvin Nutting Jr

UNITED STATES PATENT OFFICE.

CALVIN NUTTING AND CALVIN NUTTING, JR., OF SAN FRANCISCO, CAL.

IMPROVEMENT IN WHEELBARROWS.

Specification forming part of Letters Patent No. 133,170, dated November 19, 1872.

*To all whom it may concern:*

Be it known that we, CALVIN NUTTING and CALVIN NUTTING, Jr., of the city and county of San Francisco, State of California, have invented Improvements in Metallic Tubular Wheelbarrows; and we do hereby declare the following description and accompanying drawing are sufficient to enable any person skilled in the art or science to which it most nearly appertains to make and use our said invention or improvement without further invention or experiment.

Our invention relates to a coupling for connecting metal pipes or tubing where it is desired to connect the end of one pipe with the side of another, and is applicable more particularly for connecting the cross-tubes with the side tubes in the metallic tubular wheelbarrow patented by B. W. Tuthill on the 29th day of September, 1869. In Tuthill's patent the cross-tubes have their ends formed to fit the convexity of the side tubes, and are therefore liable to split if drawn too tightly against them; besides, it requires considerable trouble to fit the ends snugly against the side tubes. Our invention relates to a coupling by which the liability to split and the trouble in fitting are entirely obviated.

In order to explain our invention so that others will be able to understand its construction and application, reference is had to the accompanying drawing forming a part of this specification, in which—

Figure 1:
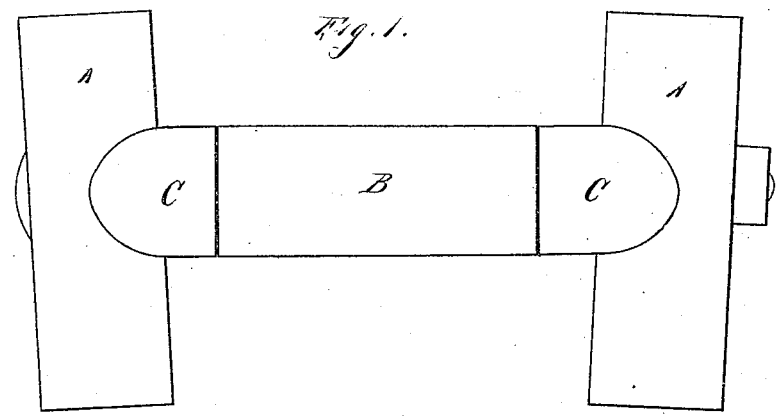
Figure 2:
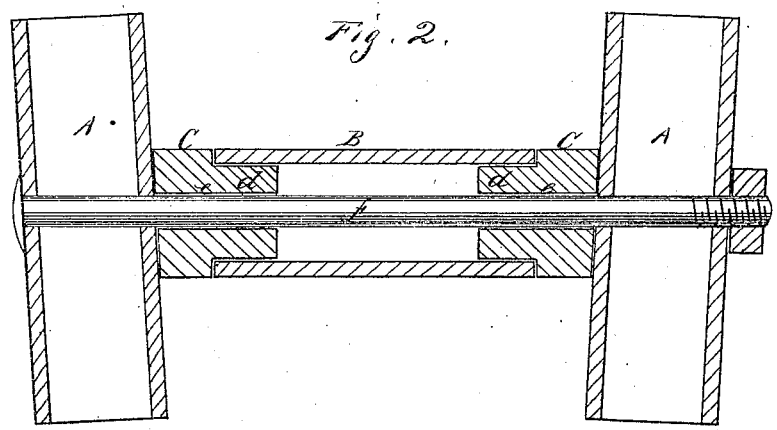
Figure 3:
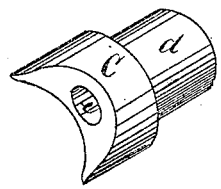

Figure 1 is a plan of a section of pipes joined to show our invention. Fig. 2 is a horizontal section of same. Fig. 3 is a perspective view of the coupling.

A represents the side tubes of a metallic tubular wheelbarrow, to one end of which the wheel is secured, while the opposite ends are formed into handles. These tubes are connected at two or more points by cross-tubes B. In order to fit the ends of the cross-tubes B against the longitudinal or side tubes A, we employ a casting or coupling, C. This coupling is of the same diameter as the tube, and has a short stem, $d$, extending from one end, of the proper diameter, to be slipped into the ends of the tubes $c$, thus leaving a shoulder against which the end of the tube B bears. The opposite end of this casting is formed so as to fit against the convexity of the side tube, and for this purpose may be beveled to accommodate the pipes A should they stand at an angle to one another, as in the case of wheelbarrow-handles. A hole, $e$, passes through the coupling, through which the rod $f$ passes, by which the tubes are firmly bound together.

When this coupling is used the ends of the cross-tubes B can be cut square off and the stem $d$ of the coupling slipped into it until the end of the tube bears against the shoulder on the coupling, thus preventing injury to the tube, avoiding splitting, and allowing the tubes to be fitted as tightly as desired.

These couplings can be obtained at a very small cost, and do away with a considerable work necessary to make a close fit when the end of the tube is fitted against the pipe A.

Having thus described our invention, what we claim, and desire to secure by Letters Patent, is—

The casting C, constructed to fit the tube A, and having the stem $d$, substantially as and for the purpose above described.

In witness whereof we have hereunto set our hands and seals.

CALVIN NUTTING. [L. S.]
CALVIN NUTTING, JR. [L. S.]

Witnesses:
PARKER CRITTENDEN,
W. F. BINGHAM.